(12) United States Patent
Morris et al.

(10) Patent No.: US 10,962,141 B2
(45) Date of Patent: Mar. 30, 2021

(54) REDUNDANT ACTUATOR POSITION CONTROL DEVICE

(71) Applicant: Flowserve Management Company, Irving, TX (US)

(72) Inventors: Daniel J. Morris, Forest, VA (US); William C. Hooss, Rustburg, VA (US); Mark D. Ollander, Forest, VA (US); Daniel E. Carlson, Rustburg, VA (US)

(73) Assignee: Flowserve Management Company, Irving, TX (US)

( * ) Notice: Subject to any disclaimer, the term of this patent is extended or adjusted under 35 U.S.C. 154(b) by 249 days.

(21) Appl. No.: 15/648,959

(22) Filed: Jul. 13, 2017

(65) Prior Publication Data

US 2019/0017625 A1    Jan. 17, 2019

(51) Int. Cl.
*F16K 37/00* (2006.01)
*F16K 31/04* (2006.01)

(52) U.S. Cl.
CPC ........ *F16K 37/0041* (2013.01); *F16K 31/043* (2013.01)

(58) Field of Classification Search
CPC .......................... F16K 31/043; F16K 37/0041
USPC ........................................................ 137/554
See application file for complete search history.

(56) References Cited

U.S. PATENT DOCUMENTS

| | | | | |
|---|---|---|---|---|
| RE30,135 E | * | 11/1979 | Fitzwater | F16K 17/36 251/66 |
| 4,693,113 A | * | 9/1987 | McNennamy | G07C 3/00 73/168 |
| 6,079,442 A | * | 6/2000 | Raymond, Jr. | F16K 31/055 137/554 |
| 6,279,870 B1 | * | 8/2001 | Welz, Jr. | F23N 1/025 251/129.04 |
| 6,305,234 B1 | * | 10/2001 | Thies | G01D 5/145 250/231.18 |
| 7,308,904 B2 | * | 12/2007 | Bria | F16K 31/046 137/311 |
| 2007/0103103 A1 | * | 5/2007 | Maue | H02P 6/16 318/280 |
| 2007/0157782 A1 | * | 7/2007 | Hetcher | B23D 59/002 83/471.3 |
| 2009/0301579 A1 | * | 12/2009 | Wong | F16K 31/046 137/489 |
| 2010/0001177 A1 | * | 1/2010 | Dolenti | G01D 5/24461 250/231.15 |

(Continued)

*Primary Examiner* — Angelisa L. Hicks
(74) *Attorney, Agent, or Firm* — Maine Cernota & Rardin

(57) ABSTRACT

An actuator position control system includes an electronic controller and encoder that control and monitor an actuator's position between its position limits, while mechanically actuated limit switches prevent attempts to exceed the actuator's position limits, even if there is a loss of calibration, software error, or electronic controller failure. When actuated, the limit switches provide position calibrating information to the electronic controller. Embodiments can control linear and/or rotary actuators. The encoder can include intermeshed gears and magnetic Hall-effect position sensors. A mechanically driven position indicator can visually indicate the actuator's position. An electromechanical control system can be included that can transition the actuator between its limits even in the event of electronic controller failure. Embodiments can alert a user if the electronic controller fails.

10 Claims, 4 Drawing Sheets

(56) References Cited

U.S. PATENT DOCUMENTS

2011/0018482 A1* 1/2011 Purcell .................... B64C 13/24
                                                        318/454
2016/0029844 A1* 2/2016 Pineda .................. A47J 43/046
                                                        366/142

* cited by examiner

REDUNDANT ACTUATOR POSITION CONTROL DEVICE

FIELD OF THE INVENTION

The invention relates to position control devices, and more particularly, to electrically driven position control devices that control actuators such as valve actuators over limited ranges of positions.

BACKGROUND OF THE INVENTION

Electrically driven position control devices are used very widely to control and regulate actuator positions for many different types of apparatus in many different environments. In the case of linear actuators, there are virtually always upper and lower limits to the range of possible actuator positions, and similar limits also apply to many rotary actuators, such as actuators that open and close rotary valves. Often, it is desirable to electronically monitor and/or control the position of an actuator when it is between these limits.

Unfortunately, electronic control systems are sometimes prone to failures that can significantly damage an actuator and associated apparatus by attempting to force the actuator to exceed one of its position limits. This can occur, for example, if accumulated mechanical errors and/or faulty software cause an electronic control system to become uncalibrated, such that it erroneously believes that the actuator is within its limits when, in fact, it is being forced outside of its limits. Also, many applications require that controllers and actuators be located outdoors and/or in locations where power sources are subject to large fluctuations and surges, for example due to lightning strikes. In the worst case, such power issues can cause an electronic control system to fail in a manner that leaves a positioning motor in an operating state, such that the actuator is driven until it exceeds one of its limits.

One approach is to forgo electronic control, and instead to implement a simple, electromechanical control system that is able to transition the actuator between its limits, but does not provide control of the actuator between those limits. For example, an electrical (or mechanical) trigger can be used to activate one or more positioning drive motors, which then operate continuously until the flow of power to the drive motor(s) is interrupted by a mechanical limit switch when the actuator reaches one of its position limits. A mechanical pointer and scale, or other mechanical indicator, and/or an electromechanical or electronic position monitoring system can be included so as to provide a visual and/or electrical indication as to the position of the actuator during the transition between limits.

This approach is simple and reliable, is not subject to loss of calibration, and can be implemented in a manner that is insensitive to issues such as power surges and fluctuations. However, this simplified approach does not provide for control of the actuator between its position limits, but instead only allows the actuator to be transitioned back and forth between its position limits. In the case of a rotary valve, for example, this approach only allows the valve to be "opened" and "closed," without allowing for adjustably controlling a rate of flow of fluid through the valve.

What is needed, therefore, is an actuator position control system that provides control of an actuator's position between its position limits, while avoiding virtually any possibility of damaging the actuator and/or associated devices by attempting to force the actuator to exceed its position limits due to a loss of calibration, software error, and/or electronic hardware failure of the control system.

SUMMARY OF THE INVENTION

An actuator position control system is disclosed that provides electronic control and monitoring of an actuator's position between its position limits, while avoiding virtually any possibility of attempting to force the actuator to exceed its position limits due to a loss of calibration, software error, and/or electronic hardware failure of the control system.

Specifically, the disclosed position control system includes an electrical drive motor system controlled by an encoder and electronic controller that monitor and control the position of an associated actuator when the actuator position is between its range limits. In addition, the disclosed position control system includes limit switches that interrupt power to the drive motor system whenever the actuator reaches one of its position limits. The position control system is further configured such that the limit switches provide signals to the electronic controller that are used to calibrate the electronic controller, so that the electronic controller maintains an accurate representation of the actual position of the actuator.

In embodiments, the actuator is a rotary actuator, and in some embodiments the encoder includes position sensors associated with gears that are mechanically linked to the location, i.e. angular orientation, of the rotary actuator. In various embodiments, the sensors are Hall-effect magnetic field sensors. Embodiments include a visual position indicator that is mechanically linked to the actuator and allows an approximate position of the actuator to be visually ascertained, even in the event of a failure of the electronic controller.

The present invention is a control system configured for controlling a position of an actuator over a range of actuator positions, said range of actuator positions extending from a first range limit to a second range limit. The control system includes an electrical drive motor system that is mechanically engaged with the actuator and configured to move the position of the actuator, an electronic controller configured to control the electrical drive motor system, a position encoder that is mechanically engaged with the actuator and configured to provide information to the electronic controller that enables the electronic controller to determine the position of the actuator when the position is between the range limits, and a mechanically actuated first current interrupting device configured to interrupt a flow of electricity to the drive motor system when the actuator position reaches the first range limit, thereby preventing the drive motor system from attempting to move the actuator position beyond the first range limit. The first current interrupting device is configured to provide actuator position calibrating information to the electronic controller when the first current interrupting device is actuated.

In embodiments, the control system further includes a mechanically actuated second current interrupting device configured to interrupt a flow of electricity to the drive motor system when the actuator position reaches the second range limit, thereby preventing the drive motor system from attempting to move the actuator position beyond the second range limit, the second current interrupting device being configured to provide actuator position calibrating information to the electronic controller when the second current interrupting device is actuated.

In any of the above embodiments, the control system can be configured to control the position of a linear actuator. Or the control system is configured to control the position of a rotary actuator.

In any of the above embodiments, the encoder can include a magnetic position sensor. In some of these embodiments, the magnetic position sensor is a Hall-effect sensor.

In any of the above embodiments, the encoder can include a plurality of inter-meshed gears, each of the inter-meshed gears being mechanically linked to a corresponding position sensor.

In any of the above embodiments, the drive motor system can include a bi-directional electric motor.

In any of the above embodiments, the drive motor system can include a plurality of electric motors.

In any of the above embodiments, the control system can further include a visual indication device in mechanical communication with the actuator and configured to provide a visual indication of the position of the actuator within the range of actuator positions.

Any of the above embodiments can further include an electromechanical controller that can be triggered when the electronic controller is inoperative so as to activate the drive motor system and cause the actuator to transition between the first range limit and the second range limit. In some of these embodiments, the electromechanical controller is configured to alert a user if the electronic controller becomes inoperative. And in some of these embodiments, the electronic controller is configured to avoid actuation of the first current interrupting device when the electronic controller is operating normally, so that actuation of the first current interrupting device indicates a failure of the electronic controller, and causes the electromechanical controller to alert the user.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is an actuator position control system that provides electronic control and monitoring of an actuator's position between its position limits, while avoiding virtually any possibility of attempting to force the actuator to exceed its position limits due to a loss of calibration, software error, and/or electronic hardware failure of the control system.

Specifically, the disclosed position control system includes an electrical drive motor system controlled by an encoder and electronic controller that monitor and control the position of an associated actuator when the actuator position is between its range limits. In addition, the disclosed position control system includes limit switches that interrupt power to the drive motor system whenever the actuator reaches one of its position limits. The position control system is further configured such that the limit switches provide signals to the electronic controller that are used to calibrate the electronic controller, so that the electronic controller maintains an accurate representation of the actual position of the actuator.

In embodiments, a separate electromechanical controller is provided that can be triggered when the electronic controller is inoperative so as to activate the drive motor system and cause the actuator to transition between its position limits. In some of these embodiments, the electromechanical controller is configured to alert a user if the electronic controller becomes inoperative. For example, in some embodiments the electronic controller is configured so as to avoid actuation of the limit switches when operating normally, so that actuation of a limit switch indicates a failure of the electronic controller, and triggers a user alert.

In the following description, features included in embodiments of the invention are disclosed with reference to a specific embodiment that controls a rotary actuator coupled to a rotary valve. However, it will be understood that the scope of the present invention extends to embodiments controlling both linear and rotary actuators and associated apparatus, wherein the actuator is limited to positions within a defined range.

Figure 1:
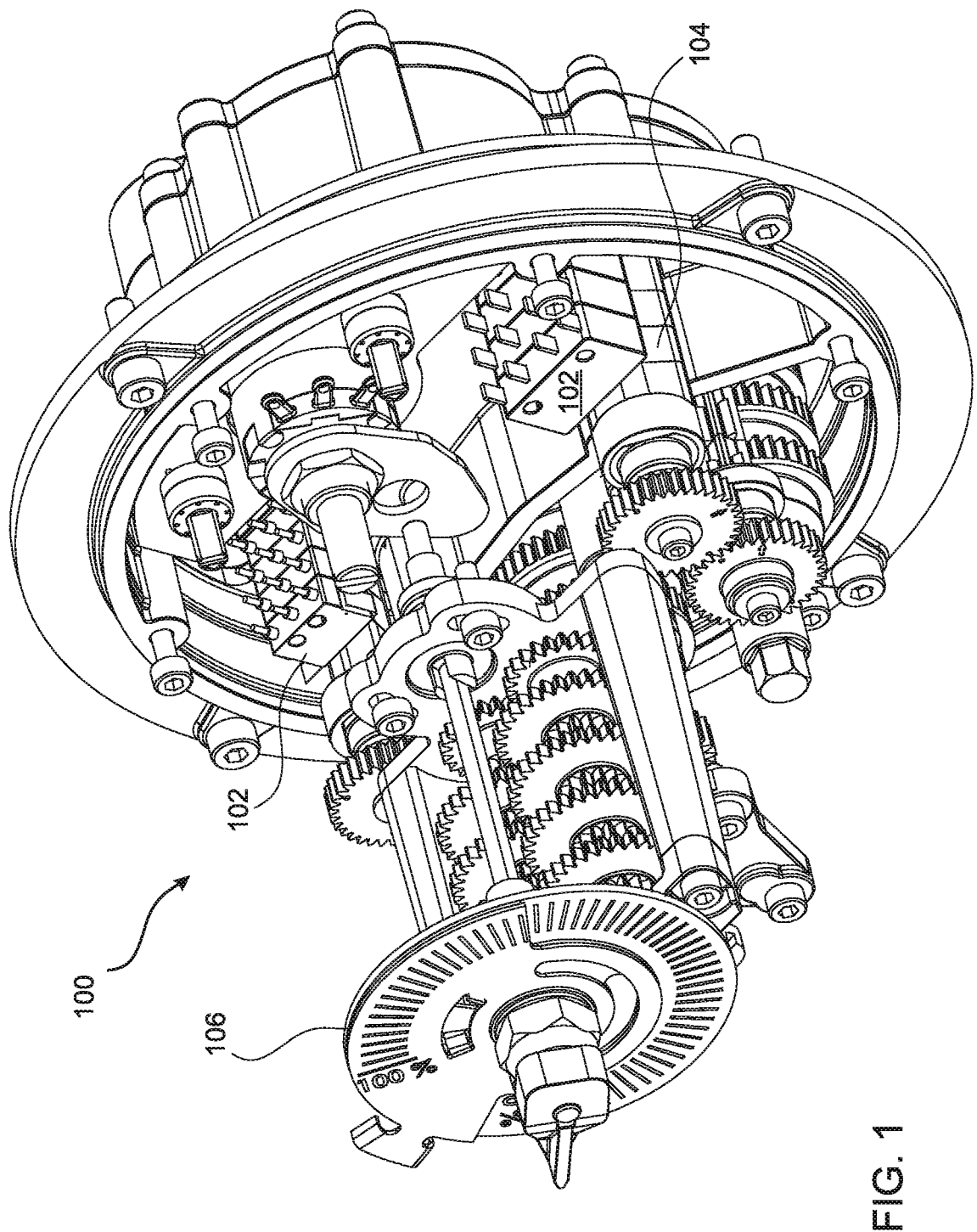
FIG. 1 is a perspective view of an electromechanical control system in an embodiment of the present invention.

With reference to FIG. 1, the disclosed invention comprises an electro-mechanical control system 100 wherein limit switches 102 are mechanically actuated when the actuator reaches an endpoint of its position range. In the embodiment of FIG. 1, the limit switches 102, which act as current interrupting devices, are actuated by rotating eccentric shafts 104. The embodiment of FIG. 1 further includes a visual position indicator 106 that functions as a visual indication device and is mechanically linked to the position of the actuator (202 in FIG. 2) and allows an approximate position of the actuator to be visually ascertained.

Figure 2:
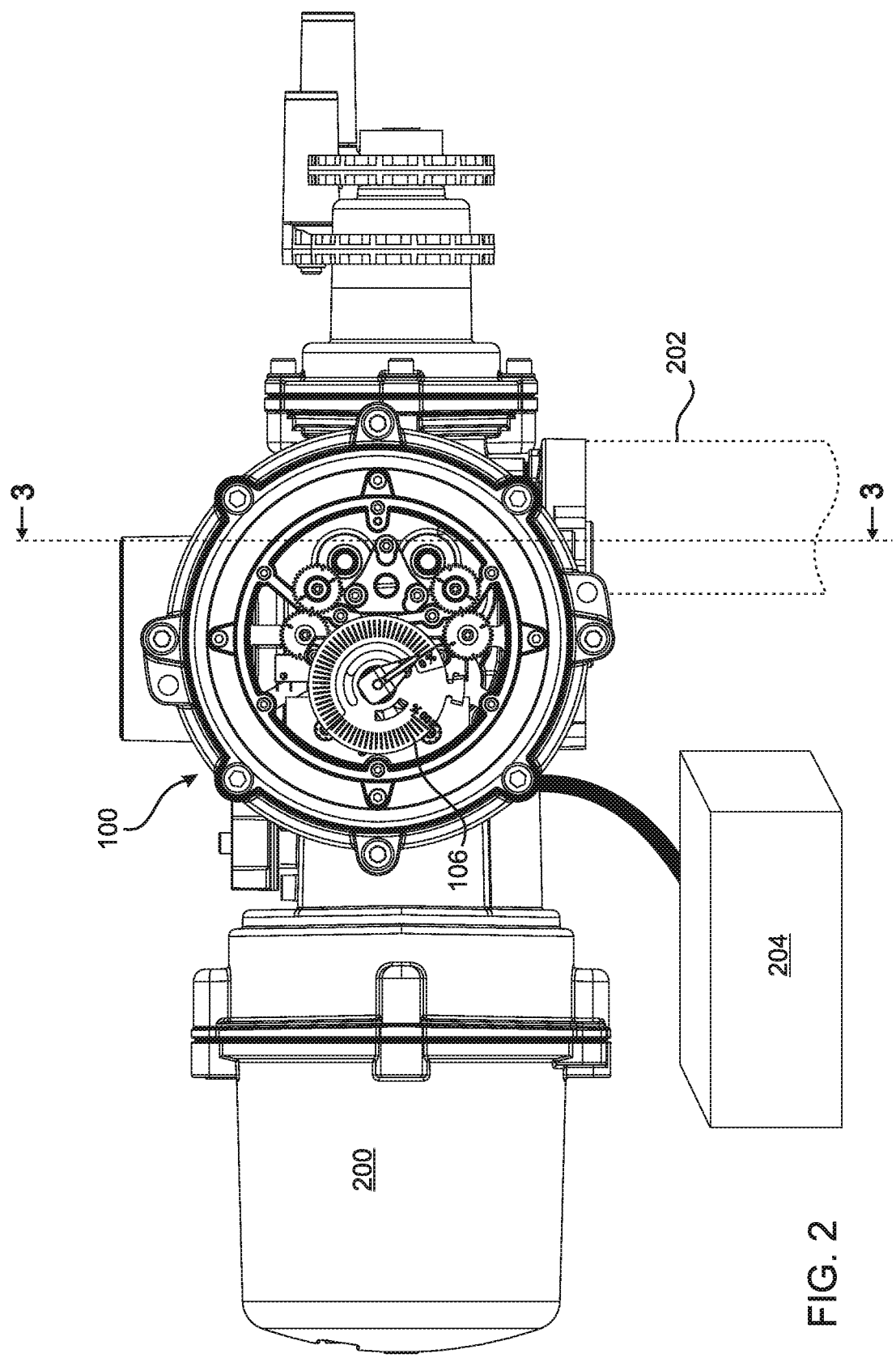
FIG. 2 is a top view of the complete embodiment of FIG. 1.

With reference to FIG. 2, when the limit switches 102 are actuated, they interrupt the flow of current to one or more actuator positioning drive motors 200, thereby preventing the motors 200 from attempting to force the actuator 202 beyond its position limits.

Figure 3:
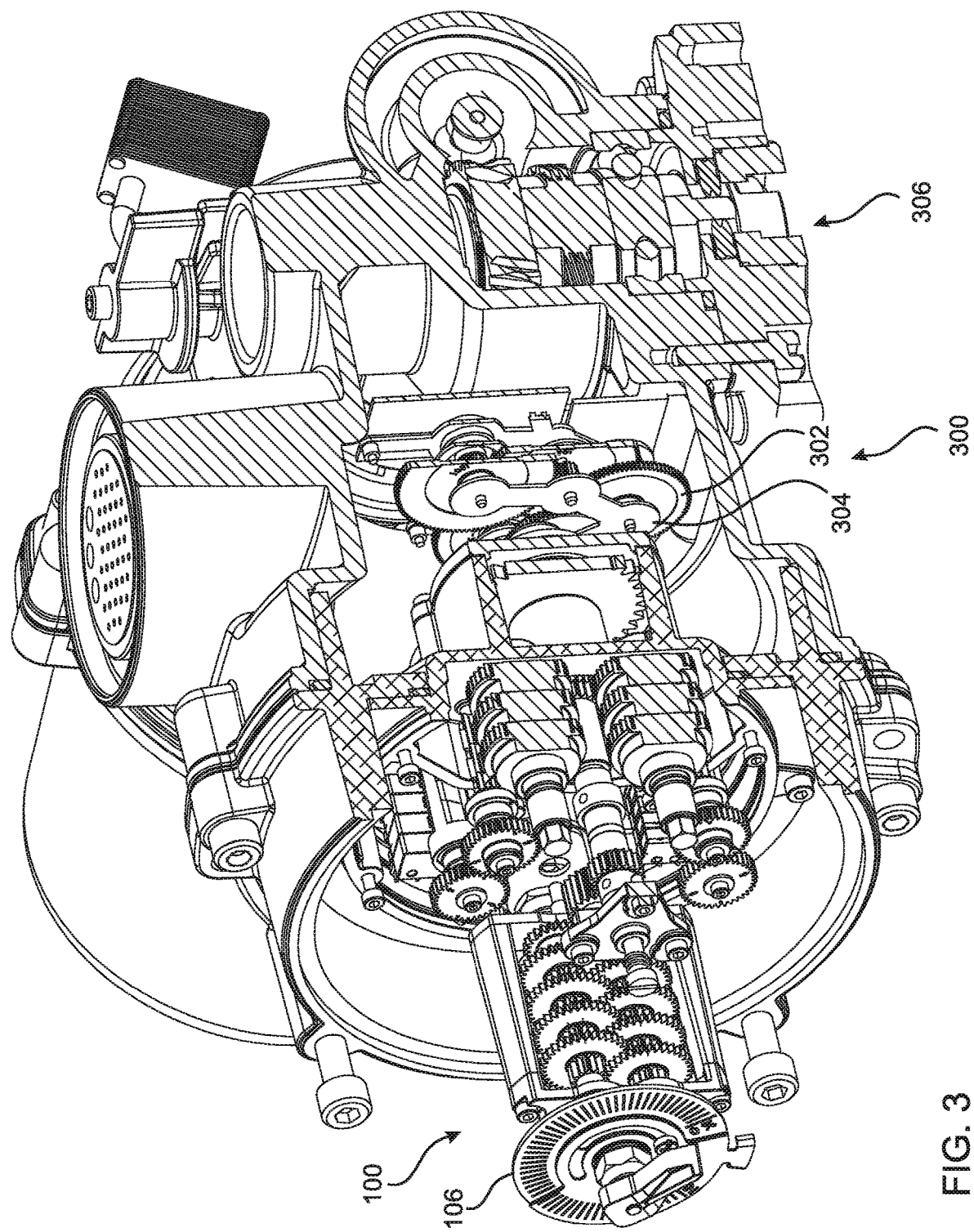
FIG. 3 is a sectional view of the electromechanical control system and encoder of the embodiment of FIG. 2.

With reference to FIG. 3, in addition to the electromechanical control system 100, the present invention further includes an encoder 300 that monitors the position of the actuator 202 within its position range. The encoder 300 is in electronic communication with an electronic controller (204 in FIG. 2) that controls the drive motor system 200, so that the controller is able to determine the actuator position based on signals received from the encoder 300, and to cause the drive motor system 200 to reposition the actuator 202 to a desired position under remote and/or automated control.

Figure 4A:
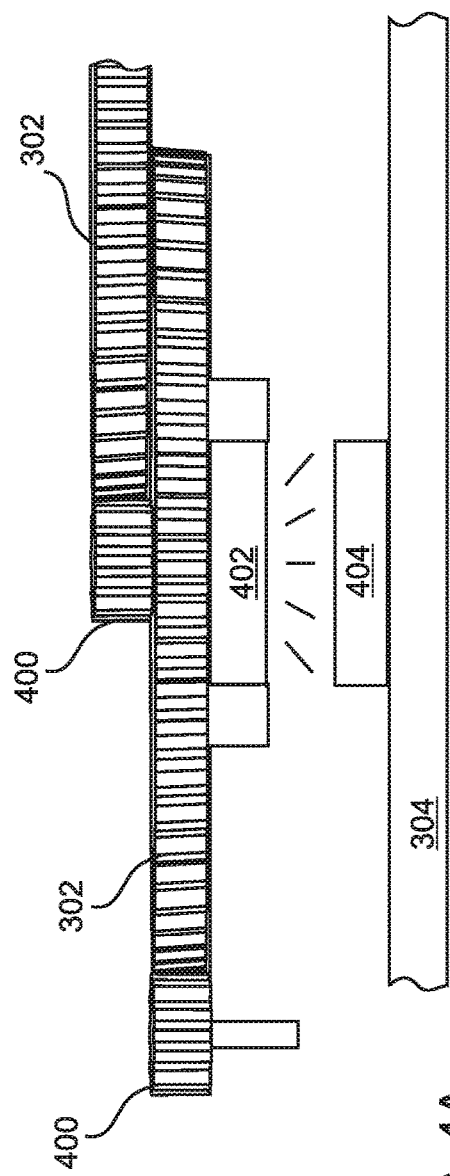
FIG. 4A is a side view of a portion of the encoder of FIG. 3.
Figure 4B:
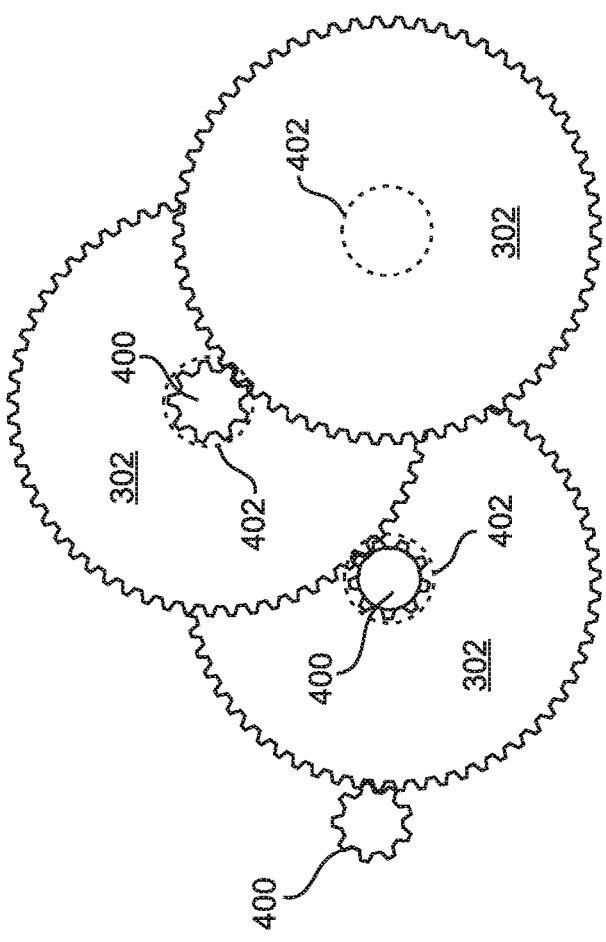
FIG. 4B is a top view of the encoder of FIG. 3.

In the embodiment of FIG. 3, the encoder 300 comprises a network of three gears 302 and associated magnetic sensors 304, which are illustrated in greater detail in FIGS. 4A and 4B. Note that the actuator 202 is not illustrated in FIG. 3. However, the space into which the actuator 202 would be inserted is indicated in FIG. 3 by an arrow 306. In the embodiment of FIGS. 2 and 3, the actuator 202 is a rotary actuator inserted from below, and includes a rotary shaft having a substantially vertical axis (in the orientation shown in the figures), the rotation of which opens and closes a valve positioned within a fluid channel flowing in a substantially horizontal direction below the illustrated control device.

FIG. 4A presents a close-up side view of a portion of the encoder 300 of FIG. 3. It can be seen that a gear 302 is driven by a first pinion 400, and that the gear 302 includes a second pinion 400 at the center thereof that drives another gear 302 in the encoder 300. In addition, a magnet 402 is mounted below the center of the gear 302, and is positioned close to a Hall-effect sensor 404 that is supported below the gear 302 by a PCB mounting board 304, so that the magnet 402 and Hall-effect sensor 404 function in combination as a magnetic position sensor.

FIG. 4B is a top view of the three gears 302 included in the encoder 300 of the embodiment of FIGS. 1-3. It can be seen that the first of the three gears is driven by a separate pinion 400, and that each of the second and third gears 302 is driven by a pinion 400 located at the center of the preceding gear 302. The dashed circles 402 in the figure indicate the locations of the underlying magnets 402 and sensors 404 that are included in the encoder 300.

Due to the multiple sensors 404 with cascaded gears 302 included in the encoder 300, the illustrated embodiment has a 6000 drive sleeve turn capability with a 12-bit control resolution over a full turn of the final gear 302. However, as noted above, the limit switches 102 prevent the actuator, and thereby the final gear 302, from completing a full revolution.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A control system configured for controlling a position of an actuator over a range of actuator positions, said range of actuator positions extending from a first range limit to a second range limit, the control system comprising:
an electrical drive motor system that is mechanically engaged with the actuator and configured to move the position of the actuator;
an electronic controller configured to control the electrical drive motor system;
a position encoder that is mechanically engaged with the actuator and configured to provide position information to the electronic controller that enables the electronic controller to determine the position of the actuator over a continuous range between the range limits;
a mechanically actuated first current interrupting device configured to interrupt a flow of electricity to the drive motor system when the actuator position reaches the first range limit, thereby preventing the drive motor system from attempting to move the actuator position beyond the first range limit; and
a mechanically actuated second current interrupting device configured to interrupt a flow of electricity to the drive motor system when the actuator position reaches the second range limit, thereby preventing the drive motor system from attempting to move the actuator position beyond the second range limit;
said first current interrupting device being configured to provide first range limit signals to the electronic controller when the first current interrupting device is actuated, and said second current interrupting device being configured to provide second range limit signals to the electronic controller when the second current interrupting device is actuated, wherein said first and second range limit signals are used by the electronic controller to calibrate the position information received from the encoder so that the electronic controller maintains an accurate representation of the actual position of the actuator between the range limits.

2. The control system of claim 1, wherein the control system is configured to control the position of a rotary actuator.

3. The control system of claim 1, wherein the encoder includes a magnetic position sensor.

4. The control system of claim 3, wherein the magnetic position sensor includes a Hall-effect sensor.

5. The control system of claim 1, wherein the encoder includes a plurality of inter-meshed gears, each of the inter-meshed gears being mechanically linked to a corresponding position sensor.

6. The control system of claim 1, wherein the drive motor system comprises a bi-directional electric motor.

7. The control system of claim 1, further including a visual indication device in mechanical communication with the actuator and configured to provide a visual indication of the position of the actuator within the range of actuator positions.

8. The control system of claim 1, further comprising an electromechanical controller that can be triggered when the electronic controller is inoperative so as to activate the drive motor system and cause the actuator to transition between the first range limit and the second range limit.

9. The control system of claim 8, wherein the electromechanical controller is configured to alert a user if the electronic controller becomes inoperative.

10. The control system of claim 9, wherein the electronic controller is configured to avoid actuation of the first current interrupting device when the electronic controller is operating normally, so that actuation of the first current interrupting device indicates a failure of the electronic controller, and causes the electromechanical controller to alert the user.

* * * * *